(No Model.) 2 Sheets—Sheet 1.

C. W. HOTTMAN.
SAUSAGE STUFFING MACHINE.

No. 490,712. Patented Jan. 31, 1893.

WITNESSES:
Albert Martin

INVENTOR:
Charles W. Hottman
BY HIS ATTORNEY
David S. Williams (No Model.) 2 Sheets—Sheet 2.
C. W. HOTTMAN.
SAUSAGE STUFFING MACHINE.
No. 490,712. Patented Jan. 31, 1893.
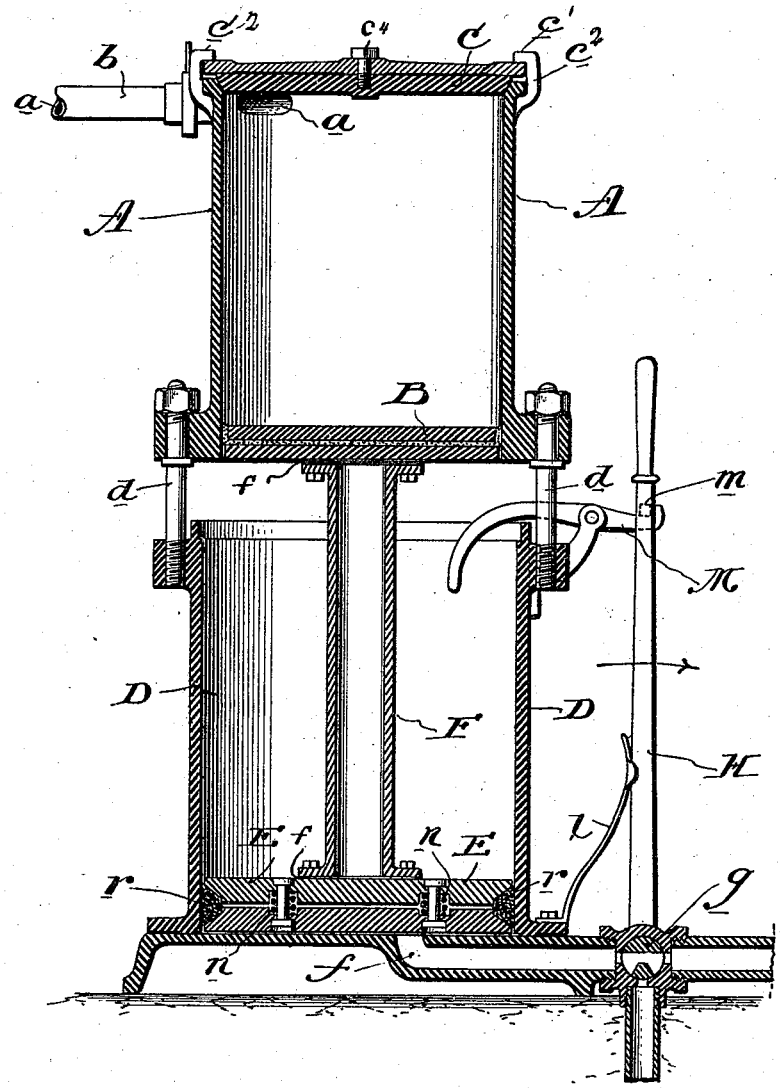
Fig. 3.
WITNESSES:
Albert Martin
J. Kitsin
INVENTOR:
Charles W. Hottman
BY HIS ATTORNEY.

UNITED STATES PATENT OFFICE.

CHARLES W. HOTTMAN, OF PHILADELPHIA, PENNSYLVANIA.

SAUSAGE-STUFFING MACHINE.

SPECIFICATION forming part of Letters Patent No. 490,712, dated January 31, 1893.

Application filed February 13, 1892. Serial No. 421,362. (No model.)

*To all whom it may concern:*

Be it known that I, CHARLES W. HOTTMAN, a subject of the Emperor of Germany, residing at Philadelphia, in the county of Philadelphia and State of Pennsylvania, have invented certain new and useful Improvements in Sausage-Stuffing Machines; and I do declare the following to be a full, clear, and exact description of the invention, such as will enable others skilled in the art to which it appertains to make and use the same.

Figure 1:
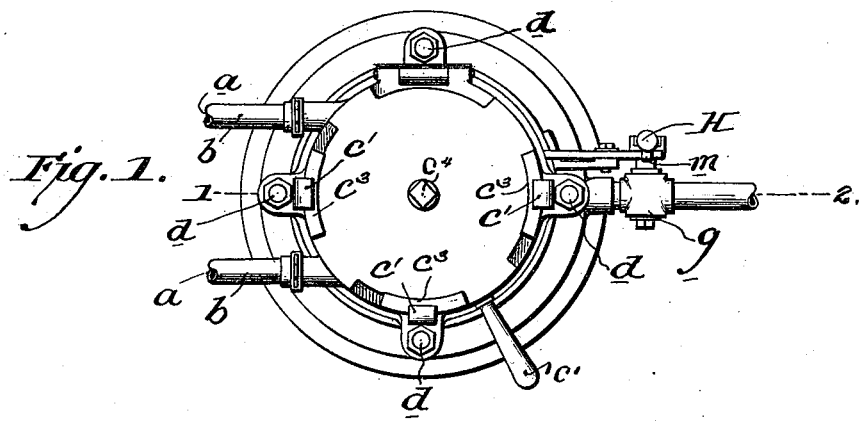
Figure 2:
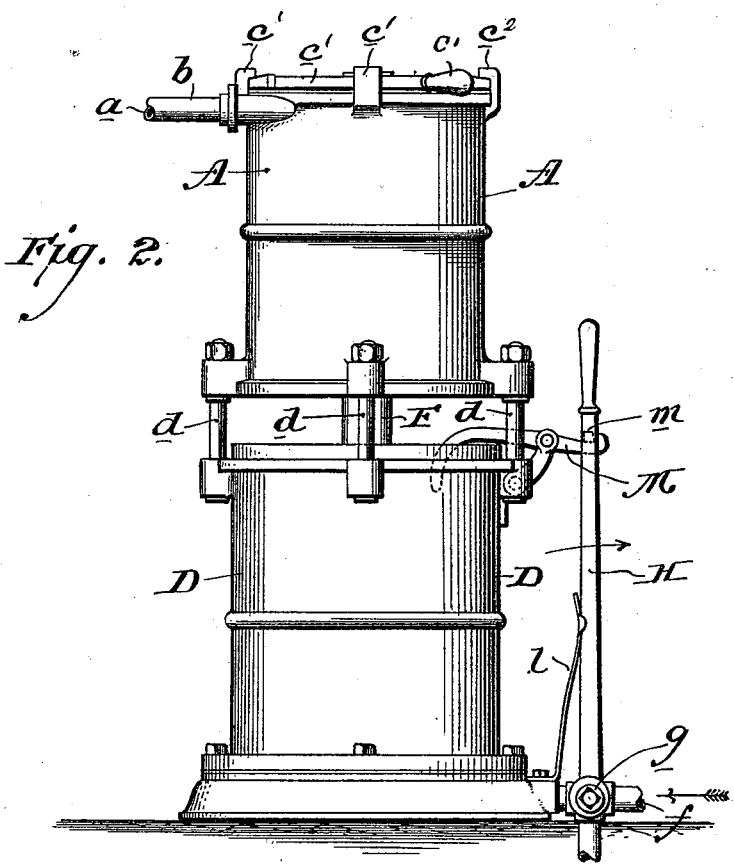

The object of my invention is to construct a machine for stuffing sausages and kindred purposes, as more fully set forth hereinafter, reference being had to the accompanying drawings, in which:

Figure 1, is a plan view of a machine constructed in accordance with my invention: Fig. 2, a side elevation of the same; and Fig. 3, is an enlarged section on line 1—2 Fig. 1.

A is a cylindrical casing for containing the meat or other material to be acted upon, and within said cylinder is a plunger B, constructed in any suitable manner and adapted to be traversed in said cylinder to expel its contents through an opening $a$ at its upper end, the opening communicating with a tube $b$ on which the skins or filling bags may be placed. The top of the cylinder A is closed by a cover plate $c$ fitting snugly and locked in position by a disk $c$ pivoted to the cover at $c^4$ and having an operating handle C', and provided with inclines $c^3$ adapted to engage with projecting lips $c'$ on the exterior of the casing, and in order to tighten the cover, the inclines are adapted to slide on the disk $c$ so that they may be drawn tightly under the projecting lips $c'$. Immediately beneath the cylinder A and supporting it by bolts $d$ is a pressure cylinder D within which is a traveling piston E of a character set forth hereinafter, and the piston E being connected to the plunger B by a piston rod F, so that the admission of steam or other fluid under pressure, beneath the piston E will act through the plunger B to force the material out of the cylinder A. At the lower end of the cylinder D is a passage $f$ for the pressure fluid and the admission of fluid is governed by a cock $g$ connected to an operating lever H, which is acted upon by a spring $l$ tending to keep the cock closed. The upper end of this lever is provided with a projecting lug $m$ adapted to be engaged by a pivoted catch lever M hinged at the upper end of the cylinder D and having one of its ends projecting into the path of the piston E, and adapted to be acted upon by the piston when it reaches the upward limit of its travel, to effect the disengagement of the lever M, and allow the spring $l$ to act upon it to close the valve. The piston E is made in two sections normally held away from each other by a series of springs $n$, and between the beveled edges of the two parts are one or more rings of asbestos packing $r$ which, when the steam enters under the lower section is forced outward against the cylinder and forms a tight packing.

When steam is used as the actuating fluid I prefer to place on the opposite ends of the piston rod F a ring $f$ of non-conducting material, such for instance as asbestus, which will prevent the heat from injuring the material in the cylinder A and further protection is afforded by the open space between the cylinders A and D for the circulation of the air.

Having thus described my invention, I claim and desire to secure by Letters Patent:

The combination in a sausage stuffing machine of the pressure cylinder D having an open upper end, a piston in said cylinder, a cylinder A having an outlet $a$, and so mounted above the cylinder D as to leave a space between the two for the circulation of air, a plunger in said cylinder A, a piston rod F connecting the piston and plunger, rings $f$ of non-conducting material between the ends of the piston rod F and the piston and plunger, the pressure inlet pipe leading into the cylinder D, a cock in said pipe, a hand lever connected to said cock, a spring acting on said lever and normally tending to keep the cock closed, and a pivoted catch lever engaging the hand lever at one end and having its opposite end in the path of the piston substantially as specified.

In testimony whereof I affix my signature in presence of two witnesses.

CHARLES W. HOTTMAN.

Witnesses:
LEWIS R. DICK,
DAVID S. WILLIAMS.